Figure 1:
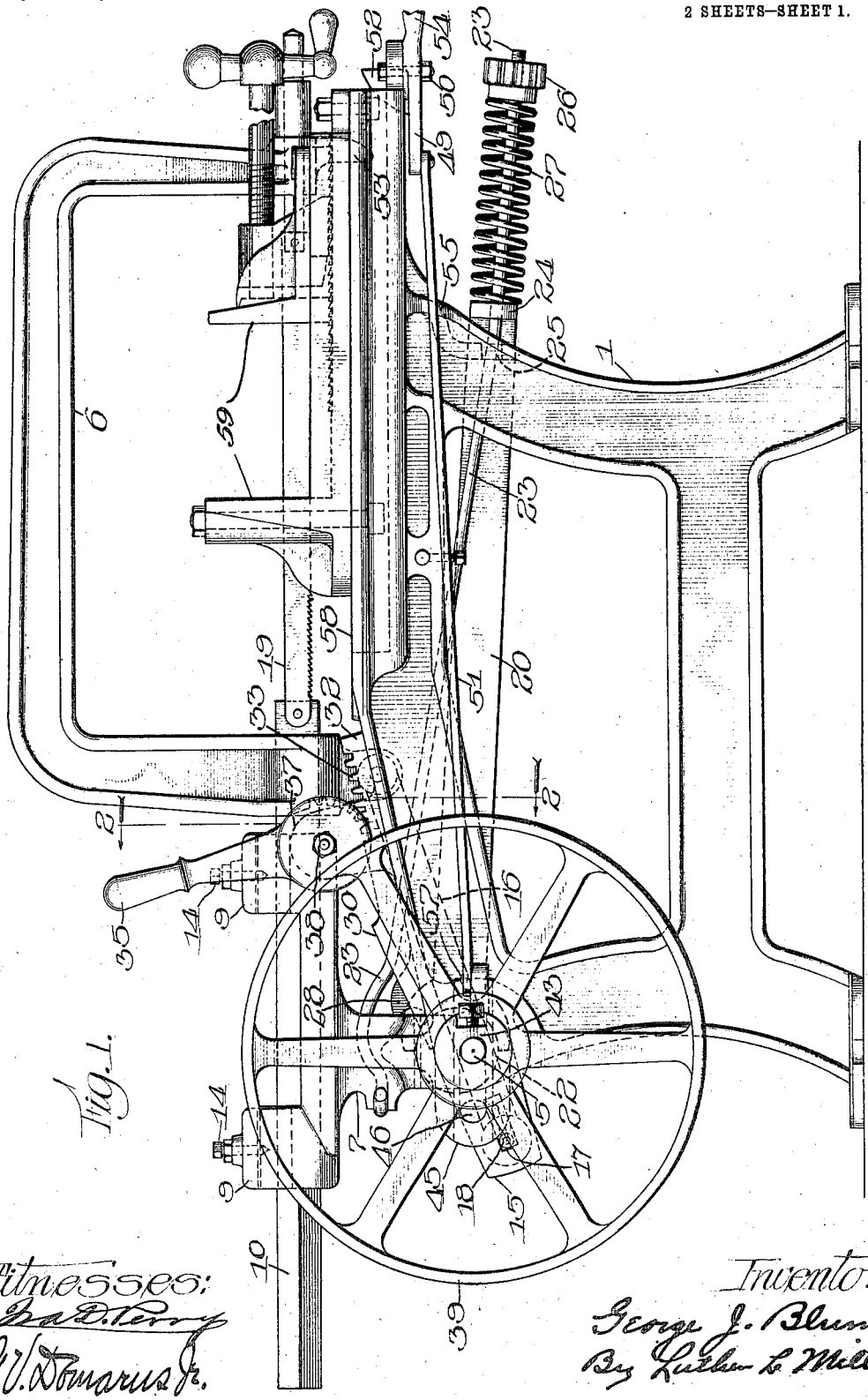

G. J. BLUM.
HACKSAW.
APPLICATION FILED DEC. 14, 1908.

1,032,650.

Patented July 16, 1912.
2 SHEETS—SHEET 1.

Witnesses:

Inventor:
George J. Blum
By Luther L. Miller

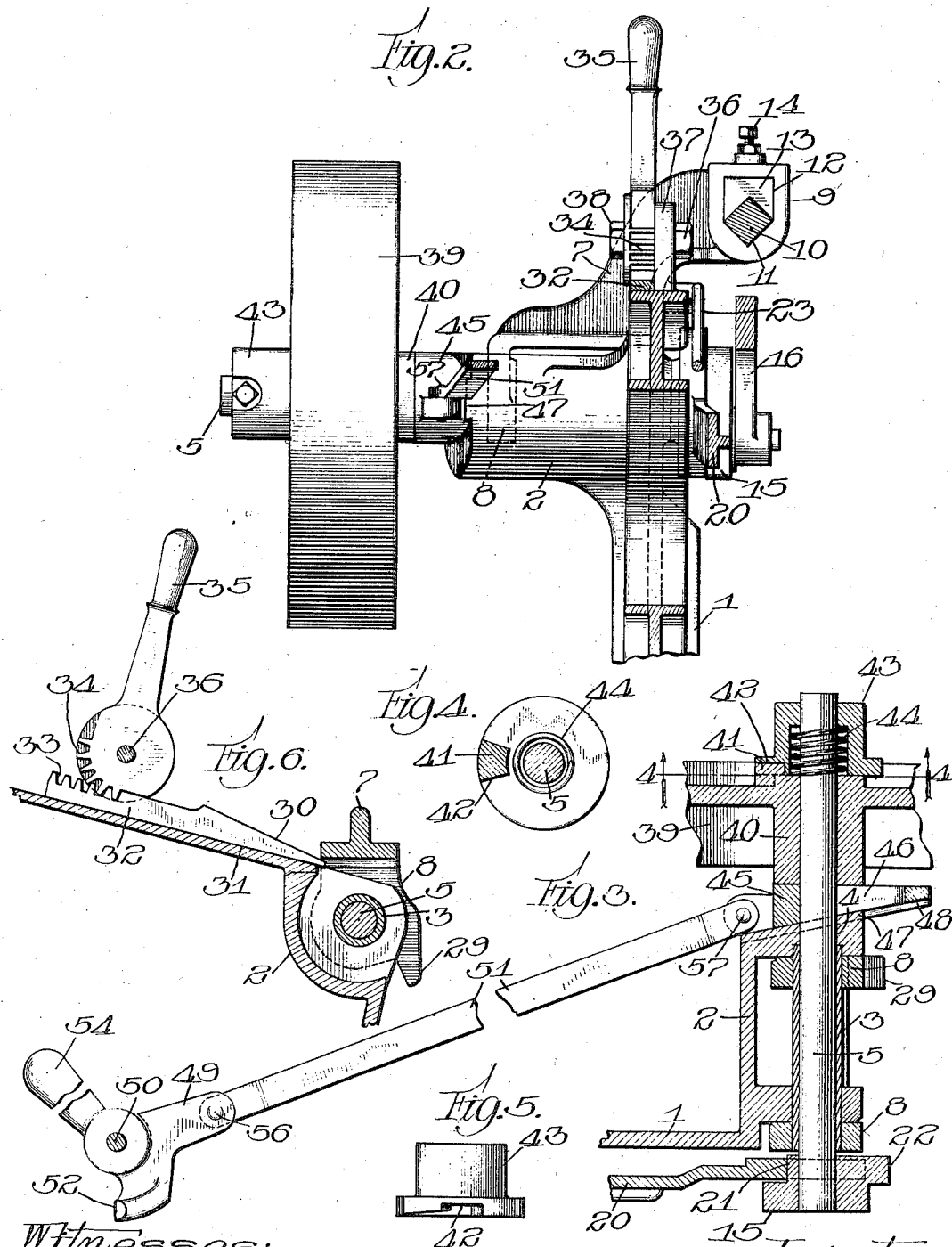

UNITED STATES PATENT OFFICE.

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

HACKSAW.

1,032,650.  Specification of Letters Patent.  Patented July 16, 1912.

Application filed December 14, 1908. Serial No. 467,341.

*To all whom it may concern:*

Be it known that I, GEORGE J. BLUM, a citizen of the United States, residing at Chicago, in the county of Cook and State of Illinois, have invented certain new and useful Improvements in Hacksaws, of which the following is a specification.

One of the objects of this invention is to provide means for augmenting the pressure upon the saw blade during its movement in one direction.

Another object is to provide means for adjustably limiting the downward movement of the saw blade.

Another object is to provide means for preventing the saw blade from dropping after it has worked its way through the article being cut, or upon reaching an opening in such article.

A further object is to provide an improved bearing for the saw which shall be adapted automatically to prevent a departure of the saw from the plane in which it is intended to operate.

A further object is to provide means for automatically stopping the machine when the cut has been completed.

The invention also relates to the other features of improvement herein set forth.

In the accompanying drawings Figure 1 is a side view of a hack saw embodying the features of my invention. Fig. 2 is a sectional view taken substantially upon the plane of dotted line 2 of Fig. 1. Fig. 3 is a horizontal sectional view taken in the plane of the drive shaft. Fig. 4 is a sectional view on line 4 of Fig. 3. Fig. 5 is a detail view of a clutch member upon the drive shaft. Fig. 6 is a detail view showing a means for limiting downward movement of the saw frame.

The embodiment of my invention which I have selected for illustration comprises a supporting frame 1 having at one end a bearing bracket 2 (Figs. 2 and 3). Fixed in said bracket is a sleeve 3, an opening 4 in the bearing bracket 2 being alined with the bore of said sleeve. Rotatably mounted in the sleeve 3 and the bearing opening 4 is a drive shaft 5.

The saw frame 6 is slidably carried by an arm 7 which is tiltably supported upon the sleeve 3 by means of the wide-spread bearing portions 8 (Figs. 2 and 3). The upper end of the arm 7 carries two alined bearings 9 to receive the stem 10 of the saw frame 6. Preferably said stem is angular in cross-section and is supported in the bearings 9 with one of its angles lying in contact with the correspondingly-shaped sides 11 of the openings 12 in said bearings. Each opening 12 is large enough to receive a block 13 shaped to conform to the stem 10 and arranged to be pressed against said stem to hold it against the side 11 by means of a set screw 14. It will be seen that the construction just described prevents the stem 10 from turning in its bearings, whereby the saw frame 6 is prevented from tilting out of a vertical plane. Wear upon the bearings for the stem 10 is taken up by adjusting the set screws 14. Owing to the form of the stem 10 and its bearings, wear upon the latter does not tend to cause the saw to depart from the plane in which it is intended to operate.

The saw frame 6 is reciprocated by means of a crank arm 15 fixed upon the end of the drive shaft 5, said crank arm being connected with the saw frame by means of a pitman 16. Preferably the pitman 16 is adjustably attached to the crank arm 15 in order that the length of the stroke of the saw frame may be altered. I have herein shown the crank arm 15 as having a slot 17 extending longitudinally thereof, a bolt 18 being adjustably secured in said slot and forming a wrist pin for the pitman 16. By moving said wrist pin toward and away from the axis of the crank arm 15, the length of the stroke of the saw may be changed.

19 designates the saw blade. Said blade is pressed against the work by the weight of the frame 6 and by means herein shown as comprising an arm 20 having at one end a socket 21 (Fig. 3) to receive an eccentric 22 upon the shaft 5. A rod 23 engages the arm 7 at a suitable distance from the axis of oscillation of said arm, said rod extending freely through an eye 24 upon the arm 20 and through a perforated lug 25 upon the frame 1. Interposed between the outer end of the arm 20 and an adjusting nut 26 turned upon the rod 23 is a compression spring 27. It will be seen that the spring 27 tends to move the arm 7 to press the saw blade 19 against the work. As the shaft 5 is rotated, the eccentric 22 causes the tension of the spring 27 to be alternately increased and diminished. The angular adjustment of the eccentric 22 and the crank arm 15 with relation to each other is preferably such that the pressure upon the saw blade while the latter is being moved rearwardly (toward the left in Fig. 1), is greater than when the saw is moving in the opposite direction.

The downward movement of the saw is positively limited by the engagement of the arm 7 with a lug 28 upon the frame 1. The extent to which the saw frame may be raised is limited by the engagement of a stud 29 (Figs. 3 and 6) with the bracket 2.

In order that the descent of the saw may be arrested at any desired point and to prevent the saw from dropping upon coming to an opening in the article being cut, I provide means comprising a wedge 30 slidably mounted upon the surface 31 of the main frame 1, said wedge being arranged to be inserted between said surface and the arm 7 and thereby limit the tilting movement of said arm in one direction (toward the right, Fig. 1). The wedge 30 is provided with a stem 32 which has a rack 33 formed thereon. The rack 33 meshes with gear teeth 34 formed upon the hub of a hand lever 35, said hand lever being pivotally supported upon a bolt 36 carried by a lug 37 on the main frame. When desired, the wedge 30 may be locked in adjusted position by tightening up the nut 38 upon the bolt 36 to fix the hand lever 35 with relation to the frame.

In this instance power is communicated to the machine through a pulley 39 having a hub 40 which is slidably mounted upon the drive shaft 5. Upon one end of the hub 40 is a lug 41 adapted to engage in a recess 42 formed in a clutch collar 43 fixed upon the shaft 5. As shown in Fig. 5, one end wall of the recess 42 is somewhat higher than the opposite wall in order that the lug 41 may engage said higher wall in the rotation of the pulley 39. A coiled spring 44 tends to move the pulley 39 out of clutch engagement with the shaft 5. The pulley 39 may be moved into position to place the lug 41 in the recess 42 by means such as a wedge 45 interposed between one end of the hub 40 and an inclined surface upon the bearing bracket 2. As herein shown, the wedge 45 has an elongated opening 46 therein through which the shaft 5 extends, said shaft supporting the wedge. The latter is guided to move in a straight line by means of a rib 47 on the frame lying in a groove 48 in the wedge.

Means may be provided for automatically stopping the machine when the saw has descended to the position shown in Fig. 1. In the construction herein shown, said means comprises a lever 49 pivotally mounted upon the forward end of the main frame 1 at 50, said lever being connected with the clutch-operating wedge 45 through the medium of a link 51. Fixed to the lever 49 is a lug 52 (Figs. 1 and 3) arranged to be engaged by a finger 53 upon the forward end of the saw frame 6. When the lug 52 is engaged by the finger 53 the lever 49 is rocked to withdraw the wedge 45, whereupon the spring 44 frees the pulley 39 from the clutch collar 43. A hand lever 54 is fixed with relation to the lever 49 to afford means for manually operating the clutch.

55 is a stop on the frame 1 which, when struck by the link 51, limits the clutch-engaging movement of the lever 49. When thus stopped, the joint 56 between the link and the lever is slightly past the dead center, that is to say, it is out of a straight line joining the pivots 50 and 57, thereby locking the clutch against accidental disengagement. (See Fig. 3.)

58 indicates a table upon which may be mounted a work-holder 59 of any suitable construction. I will not herein describe said work-holder since the particular construction thereof is not essential to the present invention.

In use, the machine is started by manually operating the hand lever 54 to clutch the pulley 39 to the drive shaft 5. As said shaft is rotated, the crank arm 15 fixed thereon causes the saw frame 6 to be reciprocated on its supports in the arm 7. As the saw works its way through the material being operated upon, the weight of the frame 6 and the pressure exerted by the spring 27 causes the saw to descend. Upon the backward stroke of the saw (to the left, Fig. 1) additional pressure is placed upon it by reason of the tension of the spring 27 being increased through the action of the eccentric 22. When the saw blade moves forward, the rotation of said eccentric relieves the tension upon the spring. The tension of said spring may be adjusted as desired by means of the adjusting nut 26.

When the machine is idle, the saw frame 6 may be supported in an elevated position by placing the wedge 30 beneath the arm 7. When work is being done and it is desired to guard against the saw blade dropping suddenly (as may occur in cutting a piece having an opening therein), the wedge 30 may be inserted beneath the arm 7 after the saw frame 6 has been lowered to bring the blade in contact with the work. In the operation of the machine, the periodical and regular changes in the pressure exerted upon the arm 7 by the spring 27 causes the wedge 30 to be gradually forced out from beneath said arm, thus permitting the saw to descend through the work. The angle of inclination of the wedge 30 is such that it cannot be suddenly forced out from beneath the arm 7.

In case it be desired to limit the downward movement of the saw blade, the wedge 30 is adjusted in position to limit further descent of the saw after it has reached the predetermined point, said wedge being fixed in such position by tightening up the nut 38.

I would have it understood that I desire not to be limited to the details of construction herein shown and described, for various modifications will occur to persons skilled in the art.

I claim as my invention:

1. In a hack saw, in combination, a saw; tiltably mounted means for slidably supporting said saw; a fixed portion; and a wedge adapted to be inserted between said fixed portion and said tiltable means for limiting the tilting movement of said means, said wedge being gradually withdrawable from such position by the pressure of said tiltable means.

2. In a hack saw, in combination, a saw; tiltably mounted means for slidably supporting said saw; a fixed portion; and a slidably mounted wedge assisting to support said tiltably mounted means and free to be forced outwardly by the pressure of said means.

3. In a hack saw, in combination, a saw; movable means for supporting the saw; a fixed portion; and a member insertible between said supporting means and said fixed portion, said supporting means bearing against said member, said member being adapted to be forced out of such position by the pressure of said supporting means.

4. In a hack saw, in combination, a saw; a tiltably mounted arm for supporting said saw; a fixed portion; and a wedge insertible between said fixed portion and said tiltable arm and adapted to be forced out of such position by the pressure of said arm.

5. In a hack saw, in combination, a saw; movable means for supporting said saw; a fixed portion; a wedge insertible between said supporting means and said fixed portion for limiting the movement of said supporting means; and means for locking said wedge in adjusted position.

6. In a hack saw, in combination, a movable member having a bearing opening therein; a saw frame having a stem of angular cross-section lying in said opening, one wall of said opening being shaped to conform to two adjacent sides of said stem; and a bearing block in said opening shaped to conform to the other two sides of said stem.

7. In a hack saw, in combination, a saw; tiltable means for slidably supporting said saw; a stationary part; a wedge insertible between said saw supporting means and said stationary part; a rack on said wedge; a lever having a gear segment thereon adapted to mesh with said rack for moving said wedge, and means for locking said lever against movement.

8. In a hack saw, in combination, a saw mounted to reciprocate; means for reciprocating the saw; and spring-actuated means for pressing the saw against the work with increased force during movement of said saw in a certain direction.

9. In a hack saw, in combination, a saw supported for reciprocation; means for reciprocating the saw; spring-actuated means for pressing the saw against the work; and means for alternately increasing and decreasing the force exerted by said pressing means.

10. In a hack saw, in combination, a saw; movable means for supporting the saw; means for actuating the saw; a spring connected with said supporting means, and tending to press the saw against the work, and means for automatically varying the tension of said spring to press the saw against the work with increased force during its movement in one direction.

11. In a hack saw, in combination, a saw; movable means for supporting the saw; means for actuating the saw; a spring connected at one end with said supporting means; an abutment for the other end of said spring; and means for reciprocating said abutment to increase and decrease the tension of the spring.

12. In a hack saw, in combination, a saw; movable means for supporting said saw; an eccentric; an arm bearing at one end against said eccentric; a rod connected at one end with the saw-supporting means; a spring interposed between the other end of said rod and said arm; and means for reciprocating the saw.

13. In a hack saw, in combination, a saw; movable means for supporting said saw; an eccentric; a longitudinally movable arm bearing at one end against the eccentric; a rod connected at one end with the saw supporting means; a spring interposed between the other end of said rod and said arm, said spring tending to press the saw against the work, and means for reciprocating the saw.

GEORGE J. BLUM.

Witnesses:
LUTHER L. MILLER,
GEORGE L. CHINDAHL.